Figure 1:
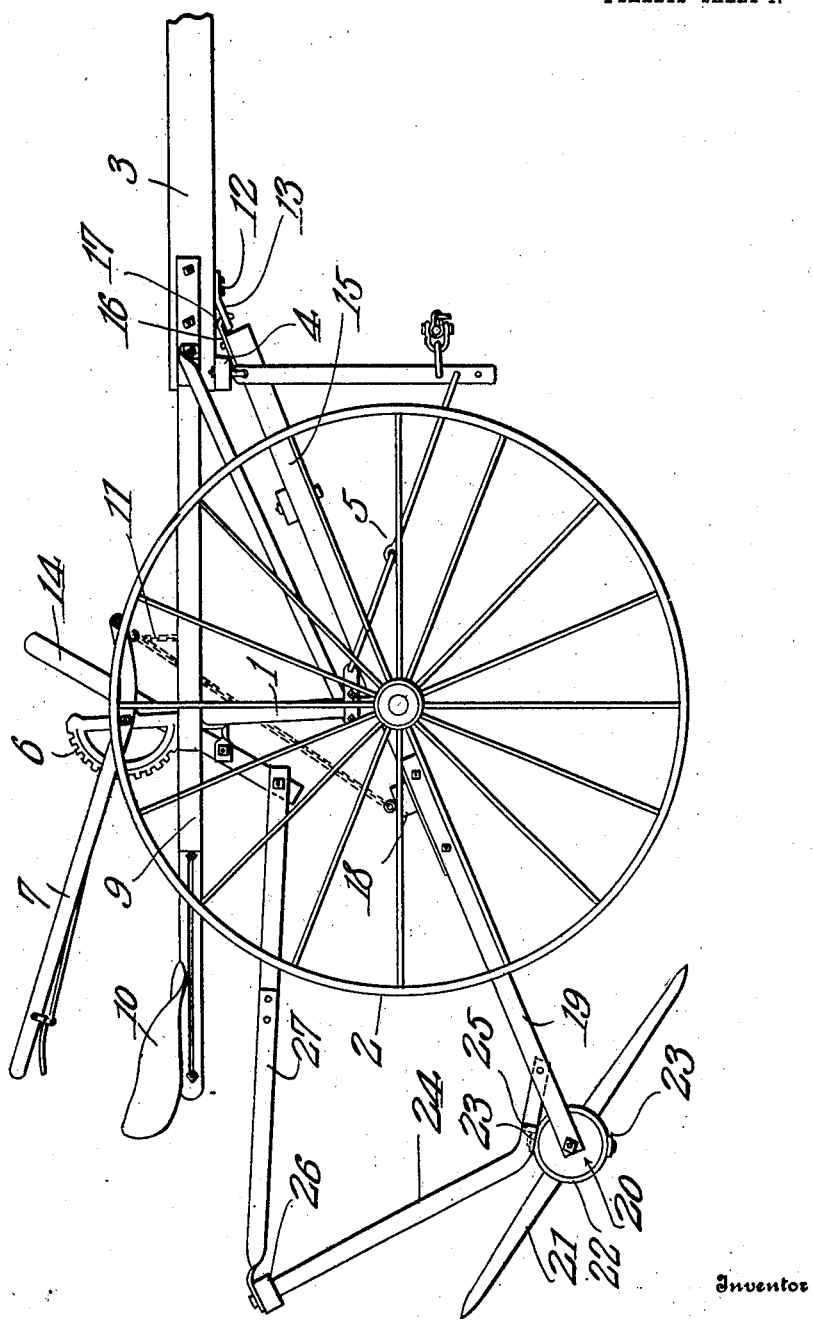

F. RICHARD.
HAY RAKE ATTACHMENT FOR CULTIVATOR FRAMES.
APPLICATION FILED NOV. 9, 1908.

918,474.

Patented Apr. 13, 1909.
2 SHEETS—SHEET 1.

Witnesses

Inventor
Frank Richard.
By C. A. Snow & Co.
Attorneys

F. RICHARD.
HAY RAKE ATTACHMENT FOR CULTIVATOR FRAMES.
APPLICATION FILED NOV. 9, 1908.
918,474.
Patented Apr. 13, 1909.
2 SHEETS—SHEET 2.
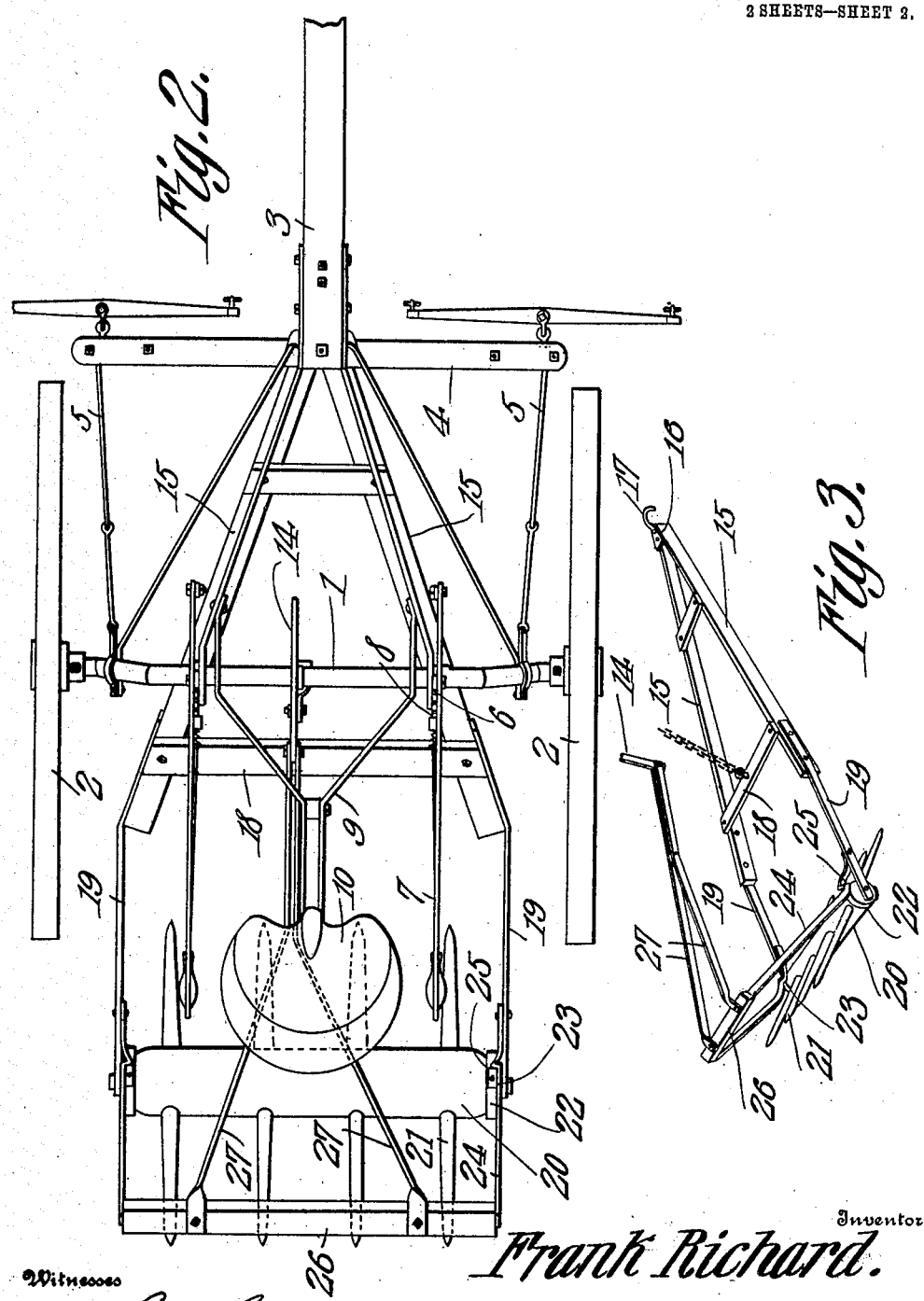
Inventor
*Frank Richard.*
Witnesses
By *C. A. Snow & Co.*
Attorneys

UNITED STATES PATENT OFFICE.

FRANK RICHARD, OF LAFOURCHE CROSSING, LOUISIANA.

HAY-RAKE ATTACHMENT FOR CULTIVATOR-FRAMES.

No. 918,474.     Specification of Letters Patent.     Patented April 13, 1909.

Application filed November 9, 1908. Serial No. 461,758.

*To all whom it may concern:*

Be it known that I, FRANK RICHARD, a citizen of the United States, residing at Lafourche Crossing, in the parish of Lafourche and State of Louisiana, have invented a new and useful Hay-Rake Attachment for Cultivator-Frames, of which the following is a specification.

This invention has relation to hay rake attachments adapted to be applied to cultivator frames and it consists in the novel construction and arrangement of its parts as hereinafter shown and described.

The object of the invention is to provide a simple and durable attachment of the character indicated, which may be easily and quickly applied to the frame of an ordinary cultivator, and, when in position thereon, may be effectually used for gathering hay.

The attachment is provided with simple and effective means whereby the bundle of hay which is collected by the raking tines may be easily and quickly deposited at any desired point without expenditure of undue energy on the part of the operator.

Figure 1 is a side elevation of the rake attachment applied to a cultivator frame. Fig. 2 is a top plan view of the same. Fig. 3 is a perspective view of the attachment detached from the frame.

The cultivator frame to which the attachment is applied consists of the arch axle 1 which is mounted upon the supporting wheels 2. The draft tongue 3 is connected with the intermediate portion of the axle 1, and the draft bar 4 is attached to the said tongue. The links 5 connect the draft bar directly or indirectly with the end portions of the axle 1 in the usual manner. The segments 6 are mounted upon the intermediate portion of the axle 1, and the levers 7 are fulcrumed at the centers of the said segments and are provided with pawls 8 which are adapted to engage the teeth at the edges of the said segments. The seat-bars 9 project rearwardly from the tongue 3 and carry the seat 10. The power ends of the levers 7 are within convenient reach of one occupying the seat 10. The chains 11 are connected with the working ends of the levers 7. The plate 12 is attached to the under side of the tongue 3 and is provided with a downwardly disposed perforated lug 13. The lever 14 is fulcrumed between the seat-supporting bars 9 in the vicinity of the intermediate portion of the axle 1.

The rake attachment consists of the forward side bars 15, which converge toward each other at their forward ends, and which connect with the plate 16, which, in turn, is provided with a hook 17, adapted to engage the perforation of the lug 13 mounted upon the under side of the tongue 3. The cross-bar 18 is attached at its ends to the rear end portions of the side bars 15 and the lower ends of the chains 11 are connected with the said cross-bar 18 in the vicinity of the ends thereof. Thus, by swinging the levers 7 the cross-bar 18 may be raised or lowered, or either end of the said cross-bar 18 may be raised with relation to the other end, if desired.

The substantially parallel arms 19 are attached to the rear end portions of the side bars 15. The shaft 20 is journaled for rotation between the rear ends of the arms 19. The tines 21 pass transversely through the shaft 20 and have end portions which project radially beyond the sides of the said shaft. The shaft 20 is provided at each end with a ring 22, and upon each ring, at diametrically opposite sides, is located a stop or lug 23. The bars 24 are pivotally connected with the inner sides of the arms 19 and are provided, at points in the vicinity of their pivoted ends, with the laterally disposed sections which form the shoulders 25. The said shoulders 25 lie in the same vertical planes as those occupied by the lugs 23 mounted upon the rings 22. The rear ends of the bars 24 are upwardly disposed and are connected with the cross-bar 26. The rear ends of the bars 27 are attached to the end portions of the cross-bar 26 and the forward ends of the said bars 27 converge toward each other and are pivotally connected with the lower end of the lever 14.

From the above description it is obvious that a simple and effective rake attachment is provided which may be easily and readily applied to the frame of a cultivator, and which, when attached thereto, may be readily manipulated by one occupying the seat 10. As the cultivator frame with the rake attachment is drawn along a field the tines 21 are held in inclined positions but slightly above the surface of the ground. Thus the said tines will pick up and accumulate hay which may lie upon the ground, and, when a sufficient quantity has been collected, the operator swings the lever 14 which, in turn, will move the bars 27 longitudinally and the cross-bar 26 laterally, which in turn, will raise the rear end portions of the bar 24 and the shoulders 25 above the lugs 23 carried by the rings 22. Thus the shaft 20 is free to rotate, and under the weight of the load carried by the tines the said shaft will turn and the load is deposited. The operator then permits lever 14 to swing back to its original position, when the movement of the parts above described is reversed and the shoulders 25 will descend into the path of movement of the lug 23, and the rotary movement of the shaft 20 will be checked and the tines 21 will be held in position to accumulate another bundle of hay. By manipulating the levers 7 the tines may be caused to operate at any desired distance above the surface of the ground, and, by manipulating any one of the said levers, the tines at one end of the shaft 20 may be caused to move in a higher or lower position, as desired, than the tines at the other end of the said shaft.

Having described my invention, what I claim as new, and desire to secure, by Letters Patent, is:—

1. A rake attachment comprising side bars which converge toward each other at their forward ends, a plate mounted at the forward ends of the said bars and having means for attachment with a frame, approximately parallel arms projecting rearwardly from the side bars, a shaft journaled for rotation between the said arms, radially disposed tines carried by the said shaft, lugs mounted upon the end portions of the said shaft, bars pivotally attached to the said arms and having shoulders which normally lie in the paths of movement of the said lugs carried by the shaft, and means for swinging the said bars so that the shoulders thereof will be carried beyond the paths of movement of the said lugs.

2. A rake attachment comprising side bars which converge toward each at their forward ends, a plate attached to the forward ends of the said side bars and having means for attachment with a frame, a cross-bar connecting the rear end portions of the said side bars together, approximately parallel arms projecting beyond the rear ends of the said side bars, a shaft journaled for rotation between the said arms and having at its end portions lugs, radially disposed tines carried by the said shaft, bars pivotally connected with the said arms and having laterally disposed shoulders which normally lie in the paths of movement of the lugs carried by the shaft, and means for moving the said shoulders out of the paths of movement of the said lugs.

3. In a rake, approximately parallel arms, a shaft journaled for rotation between the said arms and having at its end portions lugs, radially disposed tines carried by the shaft, bars pivotally connected with the said arms and having, at intermediate points, laterally disposed sections formed therein which constitute shoulders and which normally lie in the paths of movement of the said lugs, and means for swinging the said bars so that the laterally disposed sections thereof will be moved beyond the paths of movement of the said lugs.

In testimony that I claim the foregoing as my own, I have hereto affixed my signature in the presence of two witnesses.

FRANK RICHARD.

Witnesses:
P. F. LEGENDY,
G. M. DELANNE.